(12) United States Patent
Vidya et al.

(10) Patent No.: US 8,068,499 B2
(45) Date of Patent: Nov. 29, 2011

(54) OPTIMIZED TUNNELING METHODS IN A NETWORK

(75) Inventors: Narayanan Vidya, San Diego, CA (US); Tyrone D. Bekiares, Chicago, IL (US); Matthew C. Keller, Algonquin, IL (US); George Popovich, Palatine, IL (US); Narayanan Venkitaraman, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 509 days.

(21) Appl. No.: 11/463,628

(22) Filed: Aug. 10, 2006

(65) Prior Publication Data

US 2008/0037498 A1 Feb. 14, 2008

(51) Int. Cl.
*H04L 12/28* (2006.01)

(52) U.S. Cl. ............... 370/395.5; 370/338; 370/342; 370/389; 370/351; 370/395.2; 709/238; 709/230; 709/200; 709/217

(58) Field of Classification Search ............ 370/338, 370/342, 389, 392, 341, 351, 328, 395.2; 455/410; 709/214, 223, 235, 238–239, 230, 709/200, 217–219
See application file for complete search history.

(56) References Cited

U.S. PATENT DOCUMENTS

| | | | |
|---|---|---|---|
| 6,496,505 B2 * | 12/2002 | La Porta et al. | 370/392 |
| 6,708,218 B1 * | 3/2004 | Ellington et al. | 709/236 |
| 6,993,039 B2 * | 1/2006 | Borella | 370/401 |
| 7,032,242 B1 * | 4/2006 | Grabelsky et al. | 726/11 |
| 7,058,424 B2 * | 6/2006 | Gadgil et al. | 455/554.2 |
| 7,228,337 B1 * | 6/2007 | Bornstein et al. | 709/217 |
| 2002/0018456 A1 * | 2/2002 | Kakemizu et al. | 370/338 |
| 2002/0157024 A1 * | 10/2002 | Yokote | 713/201 |
| 2002/0188743 A1 * | 12/2002 | Schaffrath | 709/230 |
| 2004/0008706 A1 * | 1/2004 | Sakamoto et al. | 370/401 |
| 2004/0013118 A1 * | 1/2004 | Borella | 370/395.2 |
| 2004/0223465 A1 * | 11/2004 | Lee et al. | 370/313 |
| 2004/0246964 A1 * | 12/2004 | Grimminger et al. | 370/392 |
| 2004/0252683 A1 * | 12/2004 | Kennedy et al. | 370/389 |
| 2005/0088977 A1 * | 4/2005 | Roch et al. | 370/254 |
| 2005/0099971 A1 * | 5/2005 | Droms et al. | 370/328 |
| 2006/0072573 A1 * | 4/2006 | Broberg et al. | 370/392 |
| 2006/0109801 A1 * | 5/2006 | Ashwood Smith | 370/256 |
| 2006/0171402 A1 * | 8/2006 | Moore et al. | 370/401 |
| 2006/0173968 A1 * | 8/2006 | Vaarala et al. | 709/214 |
| 2009/0168783 A1 * | 7/2009 | Mohan et al. | 370/395.5 |

OTHER PUBLICATIONS

Joseph A. Ishac, "Survey of Header Compression Techniques", NASA/TM 2001-211154, Glenn Research Center, Cleveland, OH, Sep. 2001.

Nikander, et al., "A Bound End-To-End Tunnel (BEET) Mode for ESP", Network Working Group, Internet Draft, Jun. 30, 2004.

(Continued)

*Primary Examiner* — Nick Corsaro
*Assistant Examiner* — Chuong A Ngo
(74) *Attorney, Agent, or Firm* — Valerie M. Davis (57) ABSTRACT

A method for minimizing tunnels in a network, apparatus and computer-readable storage medium having computer readable code stored thereon for programming a computer to perform the method. The method includes the steps of: obtaining state information associated with a first node connected to a mobile network behind a mobile node; receiving a first message sent between the first node and a correspondent node, wherein a first header was removed from the first message prior to sending the first message; recreating, in one of the mobile node and a mobility agent, the first header using the state information; and sending the first message with the first header.

20 Claims, 9 Drawing Sheets

OTHER PUBLICATIONS

C. Ng, et al. "Taxonomy of Route Models in the Nemo Context" Nemo Working Group, Internet Draft, Feb. 21, 2005; 38 Pages.

P. Thubert, et al. "IPv6 Reverse Routing Header and Its Application to Mobile Networks", Network Working Working Group, Internet Draft, Feb. 14, 2007; 52 Pages.

Jongkeun Na, et al. "Secure Nested Tunnels Optimization Using Nested Path Information", Nemo Working Group, Internet Draft, Sep. 2003; 22 Pages.

* cited by examiner

OPTIMIZED TUNNELING METHODS IN A NETWORK

FIELD OF THE INVENTION

The present invention relates generally to an Internet Protocol (IP) enabled communication network and more particularly to minimizing IP headers included in packets sent within the network.

BACKGROUND OF THE INVENTION

Packets sent in communication networks wherein nodes implement Mobile Internet Protocol (MIP) and some form of security protocol can be burdened with significant packet overhead due to multiple sets of IP headers and possibly also Transmission Control Protocol (TCP) or User Datagram Protocol (UDP) headers. For example, packets to and from nodes that are connected to a mobile network behind a mobile router may include four headers that are associated with four IP tunnels—two for the mobile router and two for the node connected behind the mobile router. This is especially a problem where such packets must traverse a narrowband wireless link.

Thus, there exists a need for optimizing the use of IP tunnels in a communication network in order to minimize header overhead. Such optimization will enhance efficiency of the system overall, but will be especially useful for packets being sent over links that have a narrow bandwidth.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Before describing in detail embodiments that are in accordance with the present invention, it should be observed that the embodiments reside primarily in combinations of method steps and apparatus components related to a method and apparatus for IP tunnel optimization. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for IP tunnel optimization described herein. As such, these functions may be interpreted as steps of a method to perform the IP tunnel optimization described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device and a magnetic storage device. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, a mobile node (e.g., a mobile router) and at least one mobility agent (e.g., a home agent for the mobile router) stores state information about a node (e.g., a Visiting Mobile Node, a Home Mobile Node or a Local Fixed Node) connected to a mobile network behind the mobile router. The state information can be learned, for example, via at least one of: a registration request message sent by the first node; a registration reply message received by the first node; a message exchange between the mobile node and the first node; a Dynamic Host Configuration Protocol option; the first message; and an Internet Key Exchange message. The state information includes at least one of: a home address for the first node; a care-of address for the first node; an Internet Protocol (IP) address for a mobility agent serving the first node; and an IP address for a Virtual Private Network (VPN) server (also referred to herein as a VPN gateway).

Either the mobile router, a mobile node or a home agent for the mobile router or a Visiting Mobile Node can optimize a packet in accordance with teachings herein by performing a method for reducing the number of IP headers included with packets sent between the node behind the mobile router and a correspondent node. For example, when sending the packet between the mobile router and its home agent, instead of including a separate MIP header for each of the mobile router and a mobile node behind the mobile router, only the mobile router MIP header is included. Upon receipt of the optimized packet, the mobile router or its home agent (depending on which entity received the optimized packet) then uses the state information to recreate the mobile node's MIP header, and adds the recreated header to the packet prior to forwarding it on toward the intended destination.

In addition, where a security protocol (e.g., IPsec protocol as defined in RFC (Request for Comments) 2404) is used by both the mobile router and the node behind the mobile router, the packet can be further optimized by sending the packet between the mobile router and its home agent using only one security tunnel and by sending the packet without one of the multiple headers associated with the single security tunnel. In this manner, header overhead is further reduced which is beneficial, for instance, where the packet traverses a narrowband link. Those skilled in the art will realize that the above recognized advantages and other advantages described herein are merely exemplary and are not meant to be a complete rendering of all of the advantages of the various embodiments of the present invention.

Prior to describing the figures, a list of terms used herein is defined as follows.

IP is a protocol that enables nodes to communicate (transmit and/or receive) packets over the Internet and includes, but is not limited to, both IETF (Internet Engineering Task Force) Internet Protocol version 4 (IPv4) and Internet Protocol version 6 (IPv6), as are well known in the art.

A node (also referred to herein as an entity) is device that implements IP.

A router is a node that forwards IP packets not explicitly addressed to itself.

A host is any node that is not a router.

A link is a communication facility or medium over which nodes can communicate at the link layer, such as an Ethernet, which is below IP.

An interface is a node's attachment to a link.

A unicast routable address is an identifier for a single interface such that a packet sent to it from another subnet is identified by that address.

A packet is a header plus payload (also referred to herein as data).

A tunnel is the path followed by a packet while it is encapsulated (using one or more associated headers). The model is that, while it is encapsulated, a packet is routed to a knowledgeable decapsulation agent, which decapsulates the packet and then correctly delivers it to its ultimate destination. A security tunnel is encapsulated using a security protocol header. A mobility tunnel is encapsulated using a mobility management protocol header. An IP tunnel is encapsulated using an IP header.

A security protocol is used to create a security association between two nodes, which is a cooperative relationship formed by the sharing of cryptographic keying material and associated context. IPsec protocol is an example of a security protocol.

A home address (HoA) is a unicast routable address assigned to a mobile node, used as the permanent address of the mobile node. This address is within the mobile node's home network.

A home network is a network, possibly virtual, having a network prefix matching that of a mobile node's home address. Standard IP routing mechanisms will deliver packets destined to a mobile node's home address to the mobile node's home network.

A mobile node is a node that can change its point of attachment from one link to another, while still being reachable via its home address. A mobile node can be a mobile router or a mobile host.

A correspondent node is a peer node with which a node is communicating and which may be either mobile or stationary.

A mobility management protocol is a protocol that enables nodes to change their point of attachment in a network while still being accessible by their home addresses. Well known standard Mobile IP (MIP) (as defined in RFC 3344 entitled "IP Mobility Support for IPv4" and RFC 3775 entitled "Mobility Support in IPv6") is an example of a mobility management protocol.

A mobility agent is a router on a mobile node's home network (e.g., a home agent (HA)) or on a foreign network (e.g., a foreign agent (FA)) that implements a mobility management protocol to forward packets destined to the mobile node.

A foreign network is a network, possibly virtual, having a network prefix that does not match that of a mobile node's home address.

A visited network is a network other than a mobile node's home network, to which the mobile node is currently connected.

A binding is an association of the home address with a care-of address for that mobile node.

Registration is the process during which a mobile node sends a binding update to a mobility agent causing a binding for the mobile node to be registered.

A care-of address (CoA) is a unicast routable address associated with a mobile node while visiting a foreign network and is the termination point of a tunnel toward the mobile node for packets forwarded to the mobile node while it is away from its home network. For example, a foreign agent care-of address is an address of a foreign agent with which the mobile node is registered, and a co-located care of address is an externally obtained local address which the mobile node has associated with one of its own network interfaces.

A mobile network is a network having a network prefix assigned to a mobile router. A mobile network associated with a given router is commonly referred to as being "located behind the mobile router".

Figure 1:
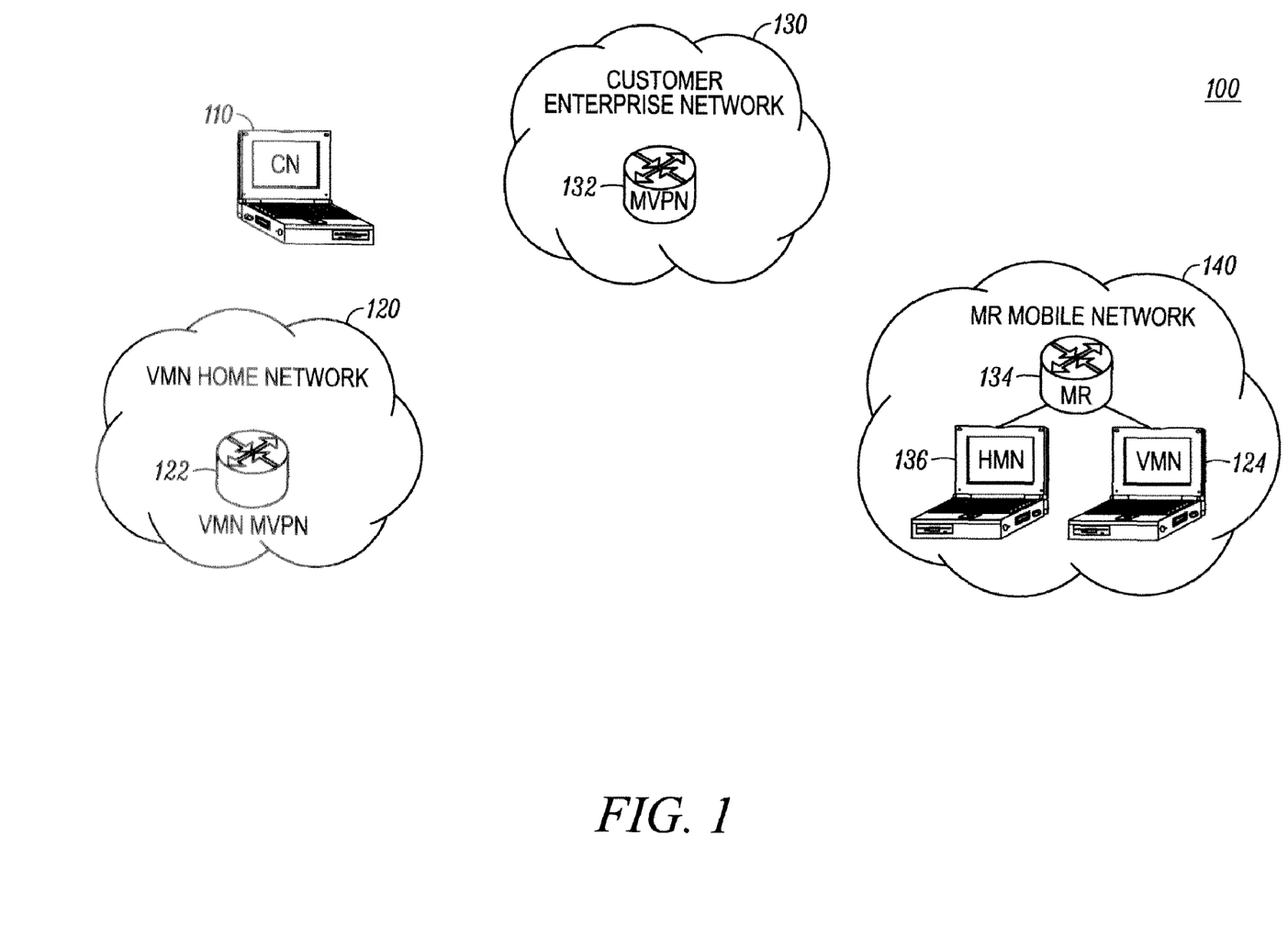
FIG. 1 illustrates a communication network in which embodiments of the present invention are implemented.

Referring now to the drawings, and in particular FIG. 1, a communication network in which embodiments of the invention are implemented is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described do not depend on the number of hosts, routers and servers in the network and the particular mobility and/or security protocols implemented, they can be applied to a network implementing different mobility and security protocols other than the particular ones described herein. Moreover, the teachings herein can be applied to a network of any size and including varying numbers of hosts, routers and servers although only a limited number of hosts, routers and servers are shown in the accompanying figures for the sake of clarity and ease of illustration.

Shown in communication network 100 is a home network 120 for a mobile host (VMN) 124 (and from which host 124 is assigned a HoA), a customer enterprise network (CEN) 130, which serves as a home network for a mobile router 134 (and from which router 134 is assigned a HoA) and a mobile network 140 behind mobile router 134. Networks 120, 130 and 140 may be interconnected using any known wireless and/or wired means and may be further connected to other access networks and the Internet across which packets may flow from a source node to a destination node. Moreover, networks 120, 130 and 140 are IP-networks, meaning that they each at a minimum provide IP connectivity for nodes and may further include devices that assign IP addresses for these nodes using IPv4 and/or IPv6. Networks 120 and 130 may further be Radio Access Networks (RANs), for example, for facilitating media exchange between nodes connected to network 100. Also shown is a correspondent node 110 that communicates with nodes in network 100.

VMN home network 120 comprises a mobility agent (e.g., VMN MVPN) 122 performing mobility management functions for mobile node 124 using a mobility management protocol such as, for instance, MIP in this embodiment (although any suitable mobility management protocol can be used). The IPSec function may be co-located in the MVPN or be a separate box. Customer enterprise network 130 comprises a mobility agent (e.g., MVPN) 132 performing mobility management functions for mobile router 134 using MIP. Connected to MR mobile network 140 is a visiting mobile node (VMN 124) and a home mobile node (HMN) 136, wherein network 140 is the home network for HMN 136 and MR 134 serves as a mobility agent using MIP.

For illustrative purposes, communication network 100 and the embodiments disclosed herein will be described in the context of a public safety implementation, although the teachings herein are in no way limited to such a context. In such a context, an aim of communication network 100 is incorporating mobile networks (e.g., MR mobile network 140), for example in public safety vehicles, to allow multiple devices (e.g., HMN 136 and VMN 124 that may be for example Personal Digital Assistants (PDAs), portable radios, mobile radios, laptops, etc., but that are shown as laptops in this illustration) in the vehicle to access the CEN 130 and/or another network through a mobile router (e.g., MR 134), which is connected to these networks. In addition, communication network 100 ideally provides for secure delivery of packets over an access network or the Internet, for instance, as mobile nodes roam around network 100, and may further provide for authentication services to control who has access to and can use resources associated within the various networks.

Accordingly, in general, the architecture of communication network 100 is built upon MIP and virtual private network (VPN) security for both individual mobile hosts and for mobile networks. The VPN security is implemented using a security protocol, which for purposes of this discussion is IPsec Protocol but can be any suitable security protocol depending on parameters including, but not limited to, customer requirements, system design constraints, cost constraints, etc. In this context, VPN implies a client/server remote access style of VPN, with at least the functions of encryption, user authentication, network authentication and basic key management.

Each logical home agent may be physically co-located with a logical VPN gateway (controlling the VPN functionality), such that a single server supplies mobility management and VPN gateway functions and to enable an IPSec tunnel to be based on a home address of a mobile node and be located inside of an MIP tunnel for enabling some of the header optimizations in accordance with the teachings herein. This single server comprising the co-located home agent and VPN gateway functionality is referred to herein as an MVPN server. Those of ordinary skill in the art will realize, however, that such physical co-location is not necessary in implementing the various teachings disclosed herein. In addition, IP and basic IP services (e.g., DHCP (Dynamic Host Configuration Protocol), DNS (Domain Name System), Web services, etc.) are supported in communication network 100. It should be noted that only one MVPN server is shown in networks 120 and 130 (e.g., VMN MVPN 122 and MVPN 132, respectively) for clarity of illustration, but there may be additional such servers implemented in one or more of these networks as needed or desired by a customer. Moreover, in general, the architecture of communication network 100 further supports mobile routers that (besides the basic mobile router functions in accordance with MIP) may include functions such as a mobile host, a VPN client, a VPN gateway, a local WVAN (Wireless Vehicular Area Network) authentication server, a provider of basic IP services, etc.

The CEN may deploy an AAA (Authentication, Authorization and Accounting) infrastructure with AAA servers, to authenticate various mobile nodes, and which implements an AAA protocol like RADIUS protocol, for example. Accordingly, the MVPN server further hosts an AAA client that communicates with an AAA server. The mobile routers and mobile hosts may be configured to dynamically obtain a CoA or co-located CoA (CCoA), and optionally support obtaining a FA CoA, and the mobile routers dynamically obtain at least one mobile subnet.

Additional detail regarding the architecture of the various elements comprising network 100 will now be provided to assist in understanding the operation of these elements and to later enable a deeper understanding of benefits associated with implementing the teachings herein. The CEN 130 hosts at least one MVPN server (e.g., 132). MVPN 132 is configured in accordance with the general architecture described above and, therefore, comprises multiple logical components including, but not limited to, a VPN gateway and a home agent. It may have additional functions of a DHCP server and an AAA client. However, in other embodiments some of these components may be implemented as standalone physical devices such as, for instance, the DHCP server. MVPN 132 may be connected to the CEN 132 using any suitable wireless or wired interface, but is usually connected using a wired interface such as, for instance, Ethernet. The VMN MVPN 122 can be configured similarly to MVPN 132 and have a suitable interface for connecting to network 120.

Mobile network 140 is a Vehicular Area Network (VAN) associated with a public safety vehicle, for example, and comprises MR 134 and may comprise Local Fixed Nodes (or LFNs, not shown), Home Mobile Nodes (or HMNs, with only one shown, e.g., HMN 136, for simplicity of illustration), and Visiting Mobile Nodes (or VMNs, with only one shown, e.g., VMN 124, for simplicity of illustration and mobile routers. LFNs, HMNs, VMNs and the MRs behind another MR are collectively referred to as MNNs (or mobile network nodes) and are supported by MR 134. In one embodiment, network 140 is further a wireless VAN (WVAN) providing Wireless Local Area Network (WLAN) connectivity around the vehicle for hosts (such as HMNs or VMNs or even LFNs) to connect wirelessly to the MR 134. However, MNNs may also connect to MR 134 through other means, such as Ethernet, USB, RB 132 and the like. Moreover, MR 134 can be directly attached to an access network (e.g., a RAN) through a transceiver or indirectly attached through a wireless modem in the vehicle, with the MR 134 to modem link being Ethernet, USB, RB 132, etc.

The basic functionality of MR 134 is to be a mobile router, and MR 134 can be a hardware or a software-based mobile router. As a mobile router, it provides IP connectivity to hosts (and routers) connected to mobile network 140. MR 134 is also responsible for advertising its capabilities inside the VAN. MR 134 can also act as a mobile host implementing MIP host functions and connecting to the CEN 130, for example, directly and/or via another mobile router. MR 134 also provides other services in the VAN such as a VPN client, a VPN gateway, authentication, DHCP, DNS, etc. As a VPN client, it establishes security associations with its MVPN server (MVPN 132) and enables applications in the MR 134 to securely communicate with nodes within CEN 130. As a VPN gateway, it enables hosts connected to mobile network 140 to use the VPN connection between MR 134 and its MVPN server. Accordingly, MR 134 in this implementation comprises multiple logical components including, but not limited to, an AAA server or proxy, possibly an AAA client, an MIP client, a VPN client, a DHCP server and a DNS server.

As stated above, the MR 134 can support at least three types of MNNs. The Local Fixed Node is always fixed behind a particular MR and, typically, has no MVPN capability. In other words, these nodes generally do not have a Mobile IP or IPSec stack that needs to be supported. Accordingly, a LFN behind MR 134 comprises logical components of a DNS client and a DHCP client, respectively, to the DNS and DHCP servers in MR 134.

The Home Mobile Node is a mobile node behind the MR, which has its home on the mobile subnet behind the MR it is attached to. The HoA of a HMN belongs to the MR's mobile subnet, and it typically shares the same MVPN server (and hence the same home agent) as the MR to which it is attached. When a HMN roams to a different MR, it becomes a VMN.

A Visiting Mobile Node is a mobile node that does not have its home on the mobile subnet to which it is attached. In MIP terms, the VMN is in a "foreign network", and obtains a CoA (or a CCoA) in the mobile network. Its HoA is usually part of the CEN or another mobile subnet (in this case network 120). Note that a VMN may or may not share the same MVPN Server (and hence HA) as the MR to which it is attached (and does not in this illustration). In this case, both the HMN 136 and VMN 124 are mobile hosts that have MIP host functions and VPN client functions that are substantially identical to MR 134. HMN 136 and VMN 124 comprise the same basic logical components of a DNS client, a DHCP client, an MIP client and a VPN client.

As stated above, also included in communication network 100 are correspondent nodes, with only one (e.g., CN 110) being shown for clarity of illustration. CN 110 has a home network, which may be network 120 or 130 or some other network, and CN 110 may be a fixed or mobile node. Let us assume, however, for purposes of this discussion that the CN is in its home network and the network connecting the CN and the mobility server with which it communicates is secure and no additional security or mobility headers are needed for clarity of illustration.

In accordance with embodiments of the teachings herein, optimizations will be explained for reducing IP headers (and thereby associated tunnels) when IP packets are being sent between the MR or any node behind a mobile router (e.g., MR 134) and a correspondent node (e.g., node 110). By adding intelligence into MR 134, its MVPN 132 and optionally MVPN 122, embodiments of the present invention enable elimination of an MIP tunnel for a VMN behind MR 134 and selective use of the VPN tunnel for MR 134, such that where MR 134 and VMN 124 do not share the same MVPN server, only one MIP tunnel (the MR 134 MIP tunnel) and one VPN tunnel can be used to send packets on the link between MR 134 and VMN 124 and such that where a VPN associated header for the one VPN tunnel can further be omitted in a packet between CN 110 and any node behind MR 134. Thus optimizations of IP headers, in accordance with the teachings herein, can be realized with respect to both mobility management headers (and associated tunnels) and security headers (and associated tunnels).

Figure 2:
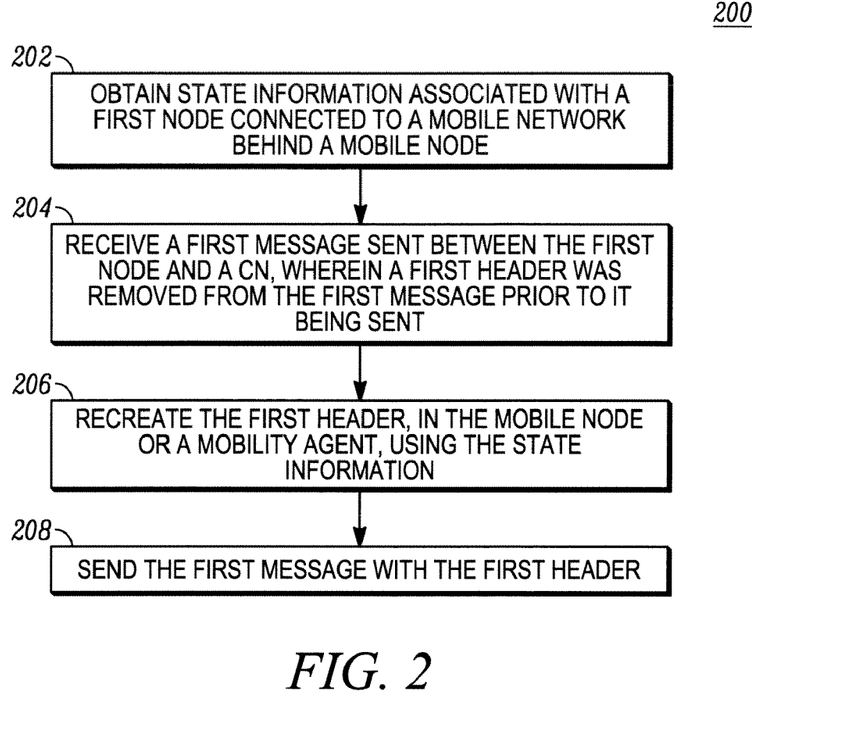
FIG. 2 illustrates a method for optimizing IP tunnels in the network illustrated in FIG. 1, in accordance with an embodiment.
Figure 3:
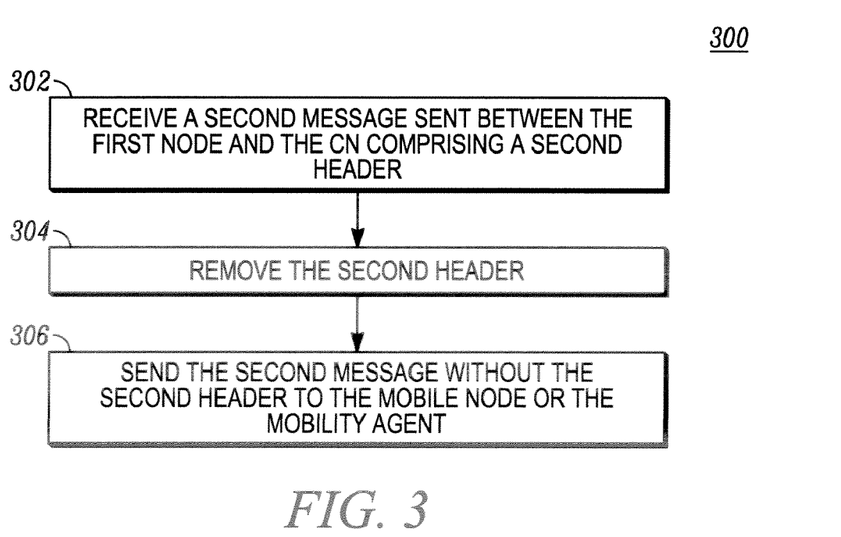
FIG. 3 illustrates a method for optimizing IP tunnels in the network illustrated in FIG. 1, in accordance with an embodiment.

Turning now to FIGS. 2 and 3 methods for minimizing tunnels in a network in accordance with embodiments herein are shown and generally indicated at 200 and 300. In the following illustrations methods 200 and 300 are being implemented in MR 134, its MVPN 132 and MVPN 122. However, those of ordinary skill in the art will realize that the teachings herein are not limited to implementation in only these types of devices. For example, where foreign agents are used certain functionality for implementing the teachings herein may be implemented in the FA. In that case, the mobility management tunnel between the MR and the MR's HA terminates at the FA. So, the FA would include the intelligence discussed in detail below for implementing the teachings herein instead of the MR. Moreover, the functionality discussed below may be implemented using apparatus that includes any suitable memory, e.g., Random Access Memory, for storing state information as discussed below, a suitable interface (e.g., wireless or wired) used for sending and receiving packets and one or more of the processing devices discussed above for implementing the optimization techniques discussed herein. The functionality discussed below may also be implemented as a computer-readable storage element having computer readable code stored thereon for programming a computer (e.g., comprising a processing device) to perform methods 200 and 300.

Method 200, in general, includes the steps of obtaining (202) state information associated with a first node (e.g., VMN 124, HMN 136 or a LFN) connected to a mobile network (e.g., network 140) behind a mobile node (e.g., MR 134); receiving (204) a first message sent between the first node and a correspondent node (e.g., CN 110), wherein a first header (MIP and/or VPN associated) was removed from the first message prior to the first message being sent; recreating (206), in the mobile node or a mobility agent (e.g., VMN MVPN 122, MVPN 132), the first header using the state information; and sending (208) the first message with the first header.

Method 300, in general, includes the steps of receiving (302) a second message sent between the first node and the correspondent node, the second message comprising a second header; removing (304) the second header; and sending (306) the second message without the second header to the mobile node or the mobility agent. Both methods will be explained in further detail by reference to the remaining FIGS. 4-10.

In order provide tunnel optimizations for VMN 124 (for example), MR 134, MVPN 132 and VMN MVPN 122 obtain (step 202) certain information from the mobility, and optionally VPN associated headers of the packets to and from VMN 124 and stores this information (in any suitable internal memory element). This information is referred to herein as "state" information and comprises one or more of the following: the VMN 124 HoA and CoA, an IP address for the VMN HA; a Security Parameter Index (SPI) associated with a VPN connection; and an IP address for the VMN VPN server. In one embodiment, this state information is obtained from a registration request message from VMN 124 to VMN MVPN 122 upon connecting to network 140 and/or a registration reply message from VMN MVPN 122 to VMN 124 responsive to the registration request, since MR 134 and MVPN 132 are in the path of the registration message exchanges between VMN 124 and VMN MVPN 122 and since the registration request and reply contain the VMN 124 HoA and CoA and HA IP address. For certain security tunnel optimizations, MR 134 and/or MVPN 132 may obtain further state information such as the VPN server IP address (for VMN MVPN 122) from messages between VMN 124 and VMN MVPN 122 such as, for instance, Internet Key Exchange (IKE) messages that contain this state information.

In this embodiment, both the MR 134 and MVPN 132 can independently obtain the state information from the registration (or security association) message sequence, or one of the devices can extract the information and forward it to the other device. In this case, ideally MR 134 extracts the state information since it usually deals with much less traffic than the MVPN 132. Moreover, in a beneficial embodiment, the state information is extracted only upon detection (using any suitable means) of a successful registration reply (or security association). This preserves storage space in MR 134 and MVPN 132.

In alternative embodiments, the state information may be obtained in other ways. For example, the MR 134 may obtain the state information using a separate message exchange with VMN 124 (separate from the registration message exchange or security association message exchange, that is), wherein VMN 124 notifies MR 134 of the state information. In another embodiment, a new DHCP option may be used to notify MR 134 of the state information. MR 134 could also detect state information for VMN 124 "on the fly", upon receiving an encapsulated packet from VMN 124. In this case, the state information is beneficially stored only upon receipt of a first reverse tunneled packet from VMN 124. Upon extracting and storing the state information for VMN 124, MR 134 communicates this information to MVPN 132 so that MVPN 132 can also save the state information.

Figure 4:
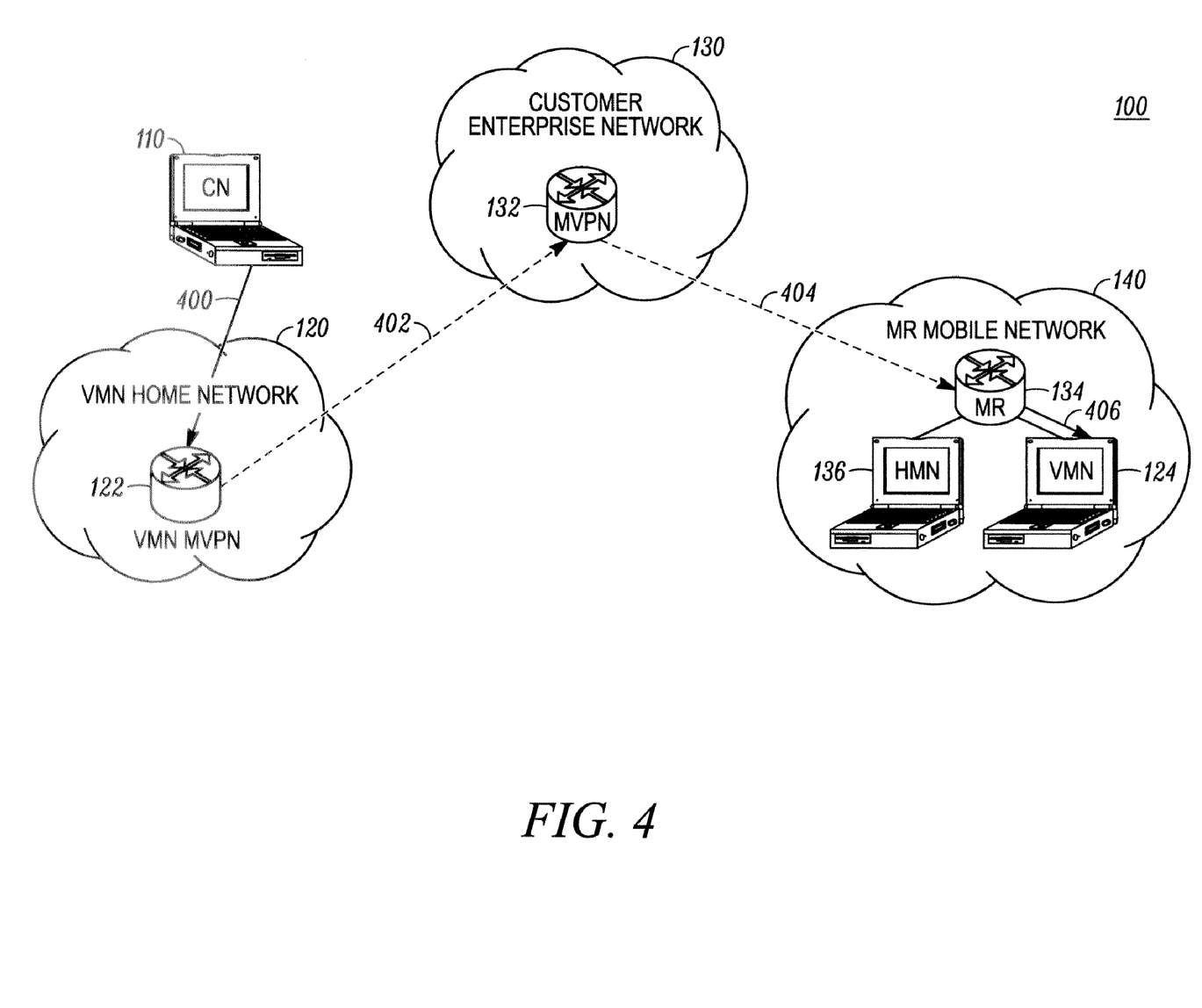
FIG. 4 illustrates a packet sent from a correspondent node to a visiting mobile node behind a mobile router, in accordance with an embodiment.

Explained next is how MR 134 and MVPN 132 use this stored state information for VMN 124 to implement embodiments of the present invention when packets are routed between CN 110 and VMN 124. Referring now to FIG. 4, a packet 400 sent from CN 110 travels along the following path in communication network 100, in accordance with standard IP and Mobile IP to reach VMN 124. Note that the reference number of the packet changes along the path to indicate changes in the headers that comprise the packet. However, the payload remains the same, except for possible encryption associated with VPN and IP fragmentation. Packet 400 travels from CN 110 to VMN MVPN 122 to MVPN 132 (as packet 402) to MR 134 (as packet 404) and, finally, to VMN 124 (as packet 406). Those of ordinary skill in the art will realize that (although not shown for ease of illustration) packet 400 may be routed using various other routers including routers in other access networks and routers in the Internet to reach its destination. Accordingly, the messages between networks 120, 130 and 140 are identified by dashed lines to indicate logical links between these networks, which may or may not be direct links.

Figure 5:
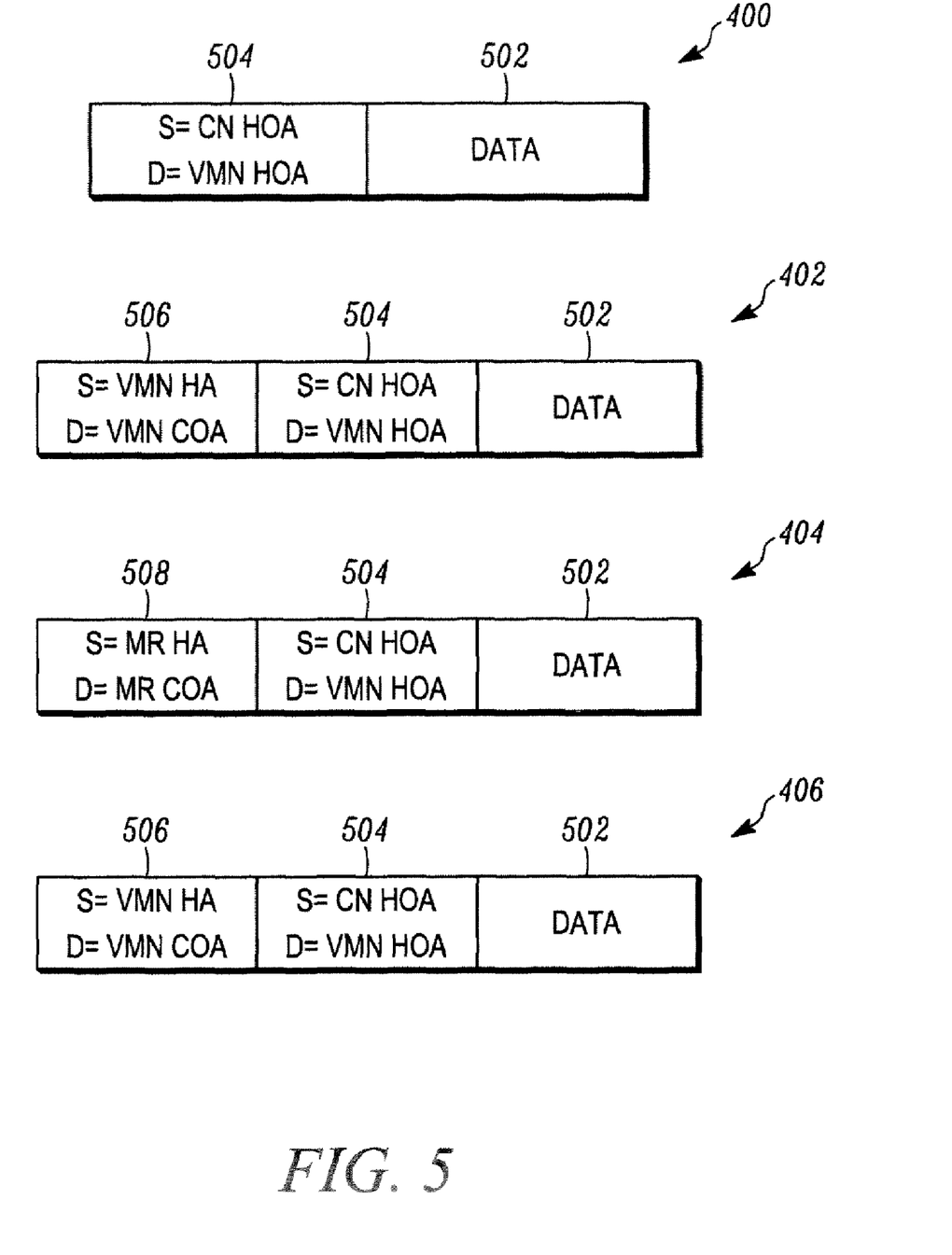
FIG. 5 illustrates optimized IP headers associated with the packet sent in FIG. 4, in accordance with an embodiment.

FIG. 5 illustrates the structure of each of the packets 400, 402, 404 and 406 along the path from CN 110 to VMN 124, in accordance with the teachings herein, showing some optimizations with respect to IP headers associated with MIP. It is assumed for purposes of the example shown by reference to FIG. 5 that no security protocol is used by MR 134 or VMN 124. However, in many implementations a security protocol is used, and additional optimizations are later described for such security protocol implementations. Packet 400 comprises data (the payload) 502 that may comprise media such as text, etc., and an IP header 504 that includes a HoA of CN 110 as a source address and the VMN 124 HoA as a destination address. Packet 402 comprises data 502, header 504 and a header 506 for establishing the MIP tunnel between VMN 124 and VMN MVPN 122. Header 506 includes the HA IP address (for MVPN 122) as the source address and the VMN CoA as the destination address.

Optimizations can be performed on the link between MVPN 132 and MR 134 to eliminate a mobility header from the packet. In this case, the HA in MVPN 132 performs method 300 (of FIG. 3): wherein it (at step 302) receives packet 402; removes (at step 304) header 506 and inserts its own mobility header; and sends (at step 306) packet 404 to MR 134 without header 506. Accordingly, packet 404 comprises data 502, header 504 and a header 508 for establishing the mobility tunnel between MVPN 132 and MR 134 that includes the IP address for the HA of MVPN 132 as the source address and a CoA for MR 134 as the destination address. In this message sequence, MR 134 performs steps 204, 206 and 208 (of FIG. 2): wherein it receives (at step 204) packet 404; recreates (at step 206) header 506 using the state information that it has stored for the VMN 124; and sends (at step 208) the resulting packet 406 to VMN 124. Packet 406 is substantially identical to packet 402 in that it comprises the data 502, header 504 and header 506.

When the HA (of MVPN server 132) "removes" (at step 304) header 506 and "inserts" its own header, this could have more than one implementation. In one embodiment, the HA may update the necessary fields in the existing header 506 to create the modified header 508. For instance, IP version number, Type of Service (TOS) and identification fields may stay the same, but the source and destination IP addresses are modified. In another embodiment, the HA may create a fresh IP header, wherein it fills in the necessary fields.

Figure 6:
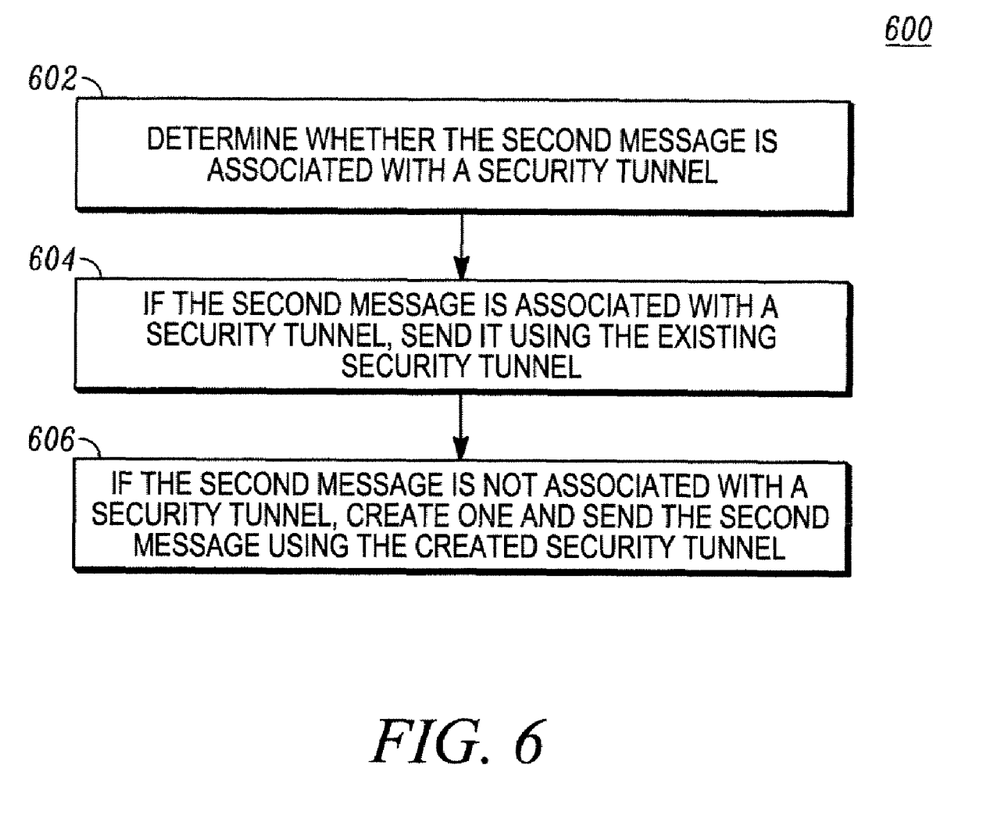
FIG. 6 illustrates a method for optimizing IP tunnels in the network illustrated in FIG. 1, in accordance with an embodiment.

As indicated above, further optimizations can be realized where a security protocol is used. FIG. 6 illustrates a method 600 that embodies an exemplary such optimization that can be performed in the MR 134 or the MVPN 132. In general, either the MR 134 or the MVPN 132 (depending on the direction of the message sequence flow) further: determines (602) whether the packet is associated with a security tunnel; if the packet is associated with a security tunnel, sends (604) the second message using the security tunnel; and if the packet is not associated with a security tunnel, creates (606) a security tunnel and sends the packet using the created security tunnel, thereby, using only one security tunnel.

Depending on the particular implementation, VMN MVPN 122 may send packets with or without a VPN tunnel, or in other words the packets may be encrypted or unencrypted. Where VMN MVPN 122 sends unencrypted packets without a VPN tunnel, the MVPN 132 creates a VPN tunnel and in accordance with the teachings above further removes the VMN 124 MIP tunnel and inserts the MR 134 MIP tunnel. This embodiment may be used, for example when the MR 134 and the VMN 124 belong to the same administrative domain, implying that the VPN tunnel is not required between the MR MVPN server and the VMN MVPN server.

However, in the event where the VMN 124 and MR 134 belong to different administrative domains, VMN MVPN 122 may use a VPN tunnel for sending packets comprising encrypted data between itself and MVPN 132. In that case, the MVPN 132 can forward the packets using the VPN tunnel already associated with the packet (which was established by VMN MVPN 122), and in accordance with the previously discussed embodiment further remove the VMN 124 MIP tunnel and inserts the MR 134 MIP tunnel. In one implementation, The MVPN 132 may detect encryption based on the presence of an IPSec ESP header.

Figure 7:
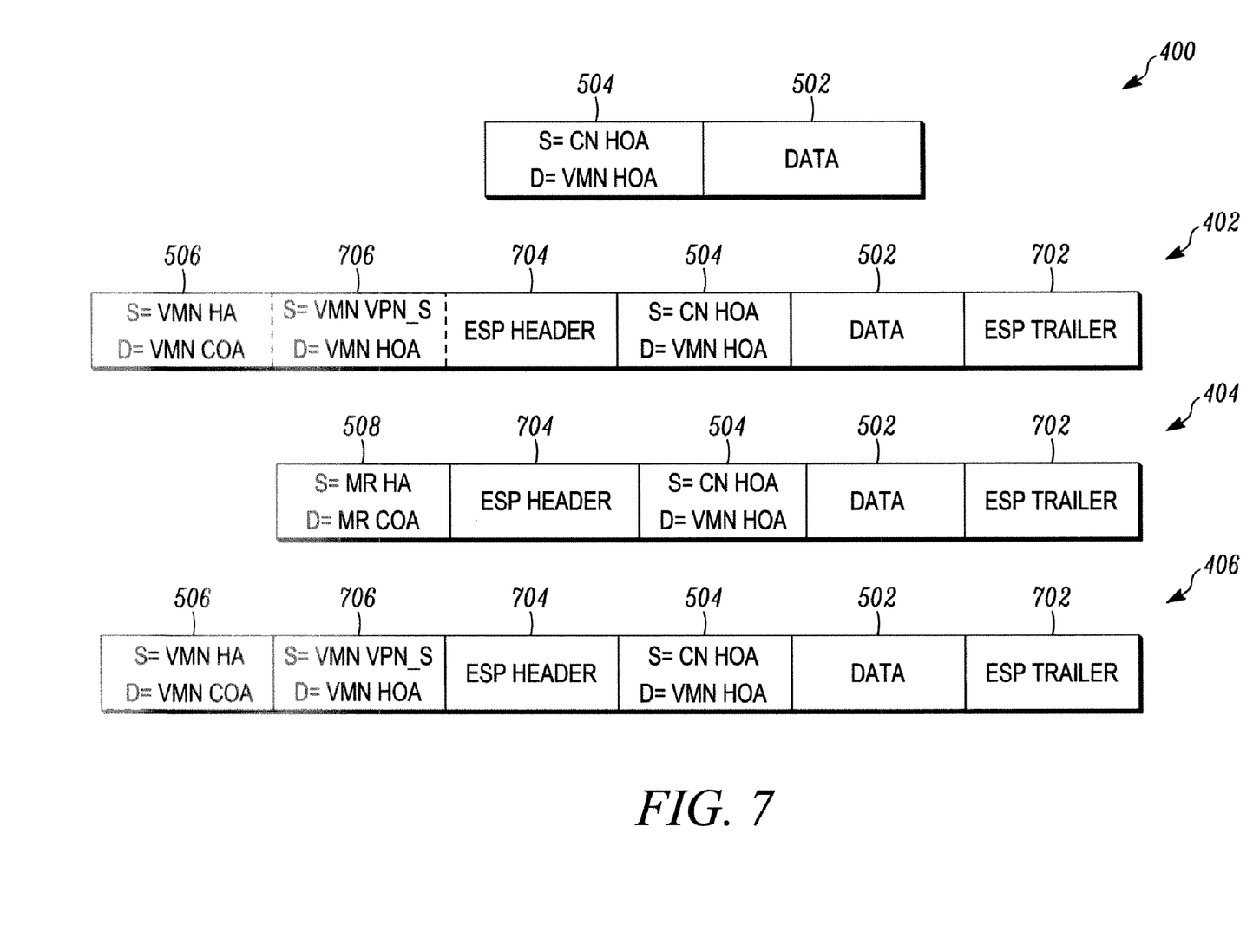
FIG. 7 illustrates optimized IP headers associated with the packet sent in FIG. 4, in accordance with an embodiment.

FIG. 7 illustrates a further optimization where a security protocol (in this case the IPsec protocol) is implemented along the path between CN 110 to VMN 124. In this case, the VMN MVPN 122 also includes intelligence to implement embodiments of the present invention. In general, when VMN MVPN 122 establishes a security tunnel (in this case using IPsec protocol) a security IP header that would have been included in packet 402 can be eliminated and then recreated in MR 134. Accordingly, using IPsec security protocol and implementing this additional optimization, packets 400, 402, 404 and 406 look as follows. Packet 400 from CN 110 to VMN MVPN 122 is identical to that shown in FIG. 5, thereby, comprising data 502 and 504.

VMN MVPN 122 sends packet 402 using IPsec security protocol. Packet 402 still includes data 502, header 504 and header 506 as described above, with data 502 and header 504 being encrypted by VMN MVPN 122. However to implement the IPsec security tunnel, packet 402 further comprises an ESP (Encapsulated Security Payload) trailer 702 after the encrypted portions 502 and 504 and an ESP header 704 before the encrypted portions 502 and 504, both in accordance with standard IPsec. However, packet 402 does not include a standard IPsec IP header 706 (shown in dashed lines to indicate that it is omitted from the packet) that includes an IP address for the VPN server (included in MVPN 122) as the source address and the VMN HoA as the destination address. Packet 404 is almost identical to packet 402 except that IP header 506 associated with the mobility tunnel for VMN 124 has been replaced by the header 508 associated with the mobility tunnel for MR 134, and packet 406 that reaches VMN 124 is almost identical to packet 402, including the headers associated with the VMN 124 VPN tunnel, except that it includes the IP header 706 that was omitted from packet 402. MR 134 recreates header 706 just as it recreated header 506, using state information that it has stored.

FIGS. 2 through 7 show exemplary implementations of embodiments of the present invention. However, numerous variations of these implementation within the scope of the teachings herein can be envisioned by one of ordinary skill in the art. A few such variations are as follows. For example, on the path from CN 110 to VMN 124 instead of the VMN MVPN performing the optimization omitting the IPsec IP header, MVPN 132 could establish the security tunnel and omit the associated IPsec IP header. Also, where CN 110 sends packets to HMN 136 or a LFN behind MR 134, only the MIP tunnel for MR 134 is used, and a security header could further be deleted where a MVPN 132 established a security tunnel.

Figure 8:
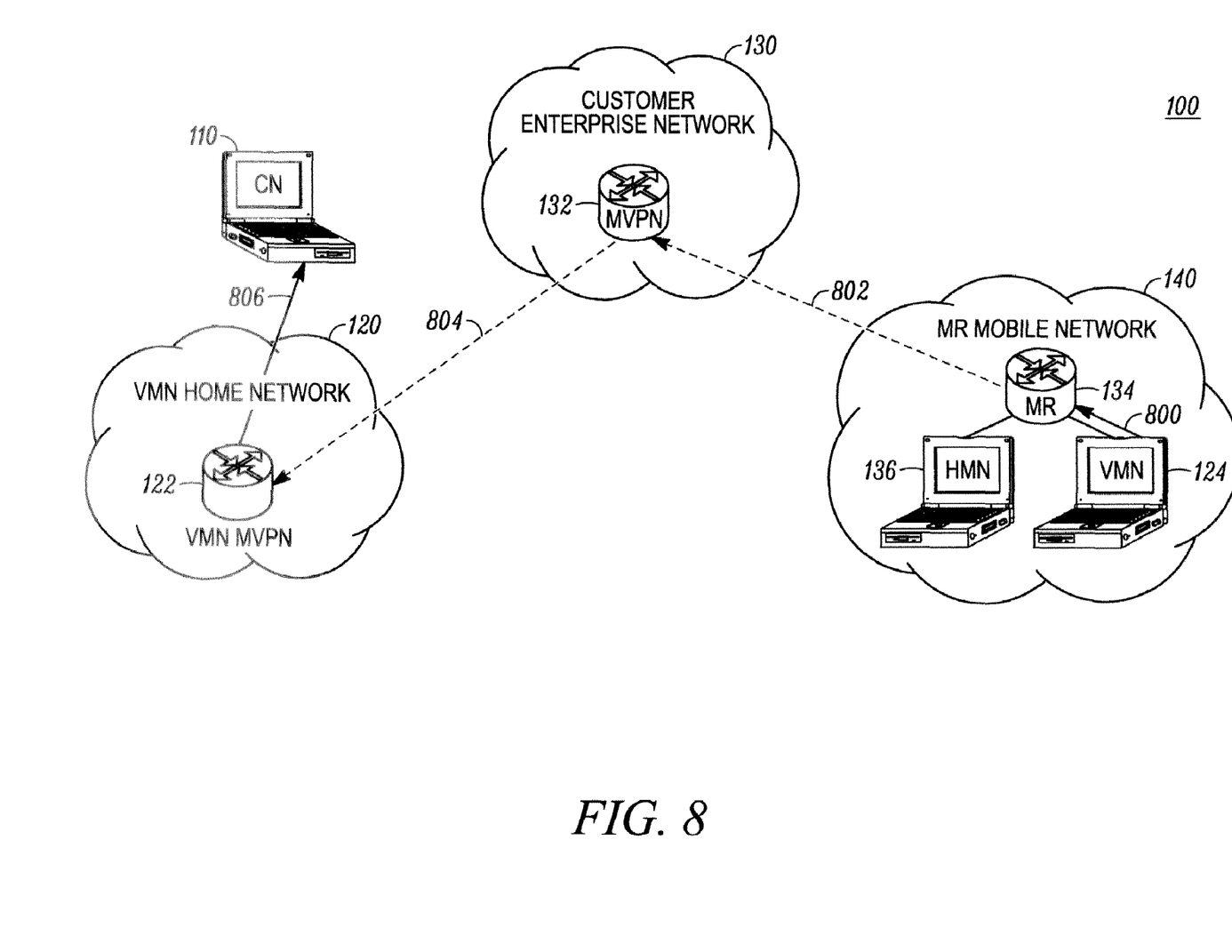
FIG. 8 illustrates a packet sent from the visiting mobile node behind the mobile router to the correspondent node, in accordance with an embodiment.

FIG. 8 illustrates an exemplary path of a packet 800 in the reverse direction from VMN 124 to CN 110 in communication network 100, in accordance with standard IP and Mobile IP. Again, note that the reference number of the packet changes along the path to indicate changes in the headers that comprise the packet. However, the payload remains the same. Packet 800 travels from VMN 124 to MR 134 to MVPN 132 (as packet 802) to VPN MVPN 122 (as packet 804) and, finally, to CN 110 (as packet 806). Those of ordinary skill in the art will realize that (although not shown for ease of illustration) packet 800 may be routed through various other routers including routers in another access network and/or the Internet to reach its destination. Accordingly, the messages between networks 120, 130 and 140 are identified by dashed lines to indicate logical links between these networks, which may or may not be direct links.

Figure 9:
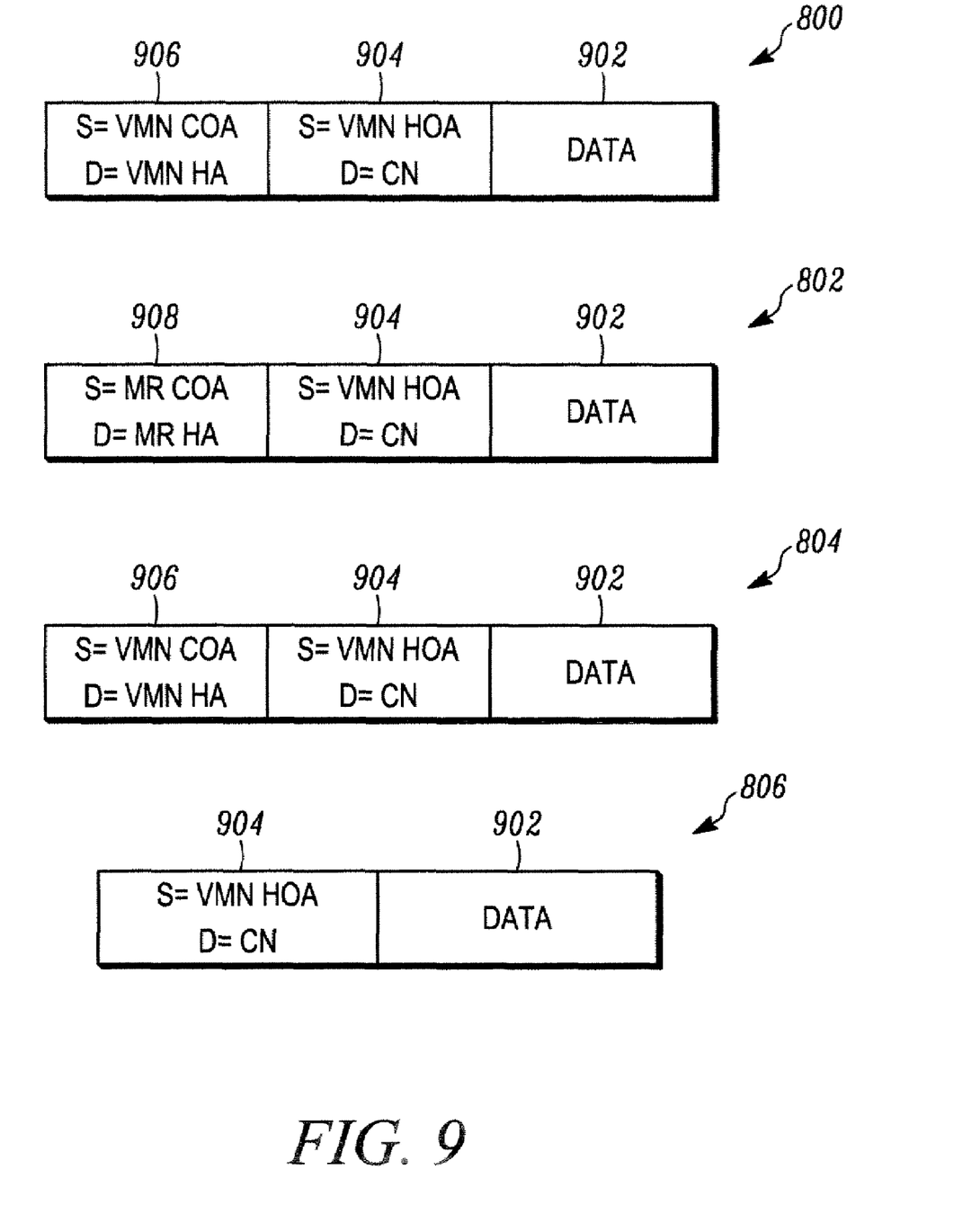
FIG. 9 illustrates optimized IP headers associated with the packet sent in FIG. 8, in accordance with an embodiment.

FIG. 9 illustrates the structure of each of the packets 800, 802, 804 and 806 along the path from VMN 124 to CN 110, in accordance with the teachings herein, showing optimizations with respect to IP headers associated with an MIP tunnel. It is assumed for purposes of the example shown by reference to FIG. 9 that no security protocol is used by MR 134 or VMN 124. However, in many implementations a security protocol is used. Packet 800 comprises data (the payload) 902, an IP header 904 that includes the VMN 124 HoA as a source address and the HoA of CN 110 as the destination address, and a header 906 to establish a mobility tunnel between VMN 124 and its HA included in MVPN 122, which includes the VMN CoA as the source address and the VMN HA IP address as the destination address.

Optimizations can be performed on the link between MVPN 132 and MR 134 to eliminate a mobility header from packet 800. In this case, MR 134 performs method 300 (of FIG. 3): wherein it (at step 302) receives packet 800; removes (at step 304) header 906 and inserts its own mobility header; and sends (at step 306) packet 804 to MVPN 132 without header 506. Accordingly, packet 802 comprises data 902, header 904 and a header 908 for establishing the mobility tunnel between MVPN 132 and MR 134 that includes the MR CoA as the source address and the IP address for the HA included in MVPN 132 as the destination address. In this message sequence, MVPN 132 performs steps 204, 206 and 208 (of FIG. 2): wherein it receives (at step 204) packet 802; recreates (at step 206) header 806 using the state information that it has stored for the VMN 124; and sends (at step 208) the resulting packet 804 to VMN MVPN 122. MVPN 122 then strips the IP header 906 from the packet and sends the resulting packet 806 to CN 120, comprising data 902 and header 904.

As with the packet flow in the opposite direction (from CN 110 to VMN 124), further optimizations can be realized where a security protocol is used. In this case, the MR upon receiving packet 400: determines (602) whether the packet is associated with a security tunnel; if the packet is associated with a security tunnel, sends (604) the packet using the security tunnel; and if the packet is not associated with a security tunnel, creates (606) a security tunnel and sends the packet using the created security tunnel, thereby, using only one security tunnel.

Figure 10:
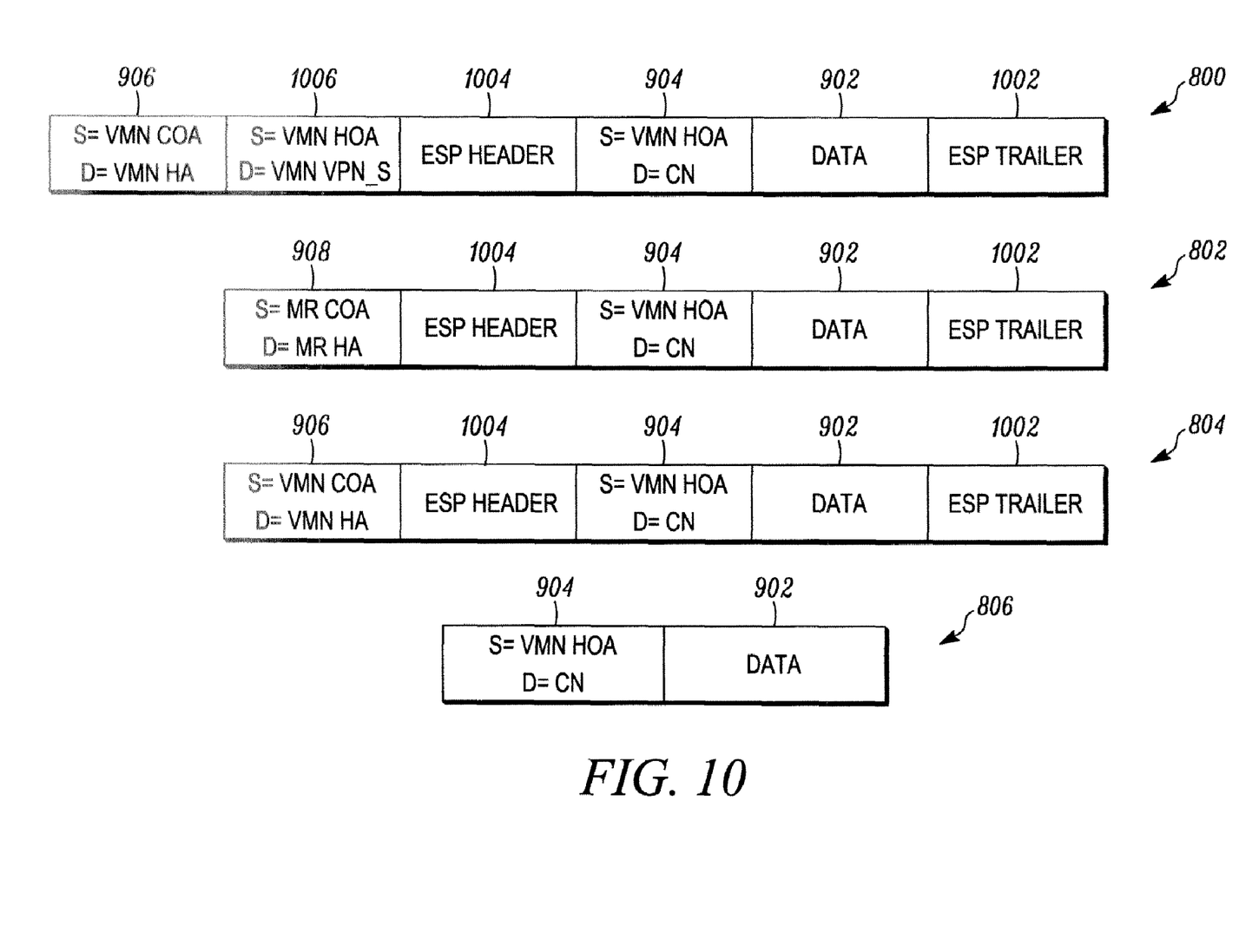
FIG. 10 illustrates optimized IP headers associated with the packet sent in FIG. 8, in accordance with an embodiment.

In addition, as with the packet flow in the opposite direction (from CN 110 to VMN 124) the further optimization of eliminating the security header (e.g., the IPsec IP header) can be implemented by MR 134. FIG. 10 illustrates the structure of packets 800, 802, 804 and 806 in this case. The VMN 122 sends packet 800 using IPsec security protocol. Accordingly, in this implementation packet 800 still includes data 902, header 904 and header 906 as described above, with data 902 and header 904 being encrypted by VMN 124. However to implement the IPsec security tunnel, packet 800 further comprises an ESP trailer 1002 before the encrypted portions 902 and 904 and an ESP header 1004 after the encrypted portions 902 and 904, both in accordance with standard IPsec. Packet 800 further comprises an IP header 1006 that includes the VMN HoA as the source address and an IP address for the VPN server included in MVPN 122 as the destination address. Packet 802 is similar to packet 800 (shown in FIG. 10) except for the omission of header 1006 and the replacement of header 906 with header 908. Packet 804 is identical to packet 802 (shown in FIG. 10), and packet 806 (of FIG. 10) is identical to packet 806 (of FIG. 9) since it is assumed that security is not needed between MVPN 122 and CN 110. In this case, the HA of VMN MVPN 122 receives the packet 804, strips header 906 and recreates header 1006 before sending the packet to the VPN server to strip the security headers and decrypt the data and header 904, wherein the packet 806 comprising the data 902 and header 904 is sent to CN 110.

In one embodiment, the MR and the mobility agents can be preconfigured to always expect that packets between them will be optimized in accordance with the teachings herein. However, in another embodiment the MR or mobility agent could dynamically detect whether it is receiving an optimized packet or a regular packet (not including the above-discussed optimizations). For example, a newly defined IP option, e.g., a VAN Optimized Packet Indication Option, could be inserted at the end of the IP header that the MR inserts (or in general in an outermost header). The presence of this option indicates to the MR's MVPN server that the packet is an optimized one and the VMN IP header establishing the mobility tunnel between the VMN and its HA is to be restored. Thus, the absence of the option will indicate that the packet was sent by the VMN without the optimizations. The MR may also be configured to inform the MVPN (and vice versa) when it receives an optimized packet corresponding to which the MR has no state information. This may then trigger an exchange of information.

Another technique is for the MR to exchange this information offline with its MVPN server in a separate message. For instance, the MR may let the HA know the particular ports for a given VMN that will be sent in unoptimized mode. When there is a lot of traffic to/from a VMN, this approach will save some bytes in each packet (by not having to include an IP option in each packet). Moreover, the message exchanged offline between the MR and the HA may be a small one and may only occur very infrequently. A third approach is to use the next header field in an outermost IP header (e.g., header 508 of packet 404 or 908 of FIG. 9) to indicate a new protocol number. However, this approach is not as robust as the first two approaches because it may in some instances have undesirable effects with firewalls that may be configured to drop unrecognized protocols.

The detection techniques discussed above were described with respect to packets sent along the path from the VMN to the CN. However, it should be understood by those of ordinary skill in the art that on the reverse path of the traffic (when packets are sent from the CN to the VMN), the MR's MVPN server or VMN's MVPN server may use the same methods to indicate optimization. Moreover, it is desirable to further reserve storage space in the MR and mobility servers implementing embodiments disclosed herein by further configuring them to discard at least a portion of stored state information after a certain time period. The simplest approach is to include a pre-configured timer in these devices, which is at least as long as the longest possible MIP registration lifetime in a given system. In another embodiment, the device could detect a registration lifetime carried in the MNN registration reply message payload and set a timer (to delete state information deletion) at least as long as the detected registration lifetime.

In the foregoing specification, specific embodiments of the present invention have been described. However, one of ordinary skill in the art appreciates that various modifications and changes can be made without departing from the scope of the present invention as set forth in the claims below. For example, the teachings herein are applicable to nested mobile networks with one or more mobile networks behind a mobile network. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method for minimizing tunnels in a network, the method comprising the steps of:
    performing by a mobile node or a mobility agent;
    obtaining state information associated with a first node connected to a mobile network behind the mobile node;
    receiving a first message sent along a path between the first node and a correspondent node, wherein while being sent along the path at least one header was added to the first message and was then later removed from the first message prior to the first message being received;
    recreating the at least one added and then later removed header using the state information to generate at least one recreated header; and
    sending the first message with the at least one recreated header along the path.

2. The method of claim 1 further comprising the steps of:
    receiving a second message sent between the first node and the correspondent node, the second message comprising a second header;
    removing the second header; and
    sending the second message without the second header to the mobile node or the mobility agent.

3. The method of claim 2, further comprising the steps of:
    determining whether the second message is associated with a security tunnel;
    when the second message is associated with a security tunnel, sending the second message using the security tunnel; and when the second message is not associated with a security tunnel, creating a security tunnel and sending the second message using the created security tunnel.

4. The method of claim 3, wherein the security tunnels are created using IPSec Protocol.

5. The method of claim 1, wherein the first message is sent in accordance with one of Internet Protocol version 4 and Internet Protocol version 6.

6. The method of claim 2, wherein the step of removing the second header comprises one of:
updating a plurality of fields in the second header to generate a third header; and
replacing the second header with a fourth header.

7. The method of claim 1, wherein the state information is obtained from at least one of: a registration request message sent by the first node; a registration reply message received by the first node; a message exchange between the mobile node and the first node; a Dynamic Host Configuration Protocol option; the first message; or an Internet Key Exchange message.

8. The method of claim 1, wherein the state information comprises at least one of: a home address for the first node; a care-of address for the first node; an Internet Protocol (IP) address for a mobility agent serving the first node; an IP address for a Virtual Private Network entity; or a Security Parameter Index (SPI).

9. The method of claim 1, wherein the at least one header is associated with at least one of a mobility management tunnel or a security tunnel.

10. The method of claim 9, wherein the mobility management tunnel is in accordance with Mobile Internet Protocol (MIP).

11. The method of claim 1 further comprising the step of detecting that the at least one header was removed, the detecting comprising at least one of:
detecting a predefined Internet Protocol (IP) option included in an outermost header included in the first message;
receiving an indication in a different message from the first message; or
detecting a modification in an IP header included in the first message.

12. The method of claim 1, wherein the step of obtaining state information is performed after the step of receiving the first message.

13. The method of claim 12, wherein the state information is obtained from a sender of the first message.

14. Apparatus for minimizing tunnels in a network, the apparatus comprising:
a memory element configured to store state information associated with a first node connected to a mobile network behind a mobile node;
an interface configured to receive a first message sent along a path between the first node and a correspondent node, wherein while being sent along the path at least one header was added to the first message and was then later removed from the first message prior to the first message being received;
a processing device coupled to the memory element and interface and configured to recreate the at least one added and then later removed header using the state information to generate at least one recreated header, wherein the first message with the at least one recreated header is sent along the path using the interface.

15. The apparatus of claim 14, wherein the apparatus comprises one of a mobile router, a home agent or a foreign agent.

16. The apparatus of claim 14, wherein the processing device comprises at least one of: a microprocessor executing code, an Application Specific Integrated Circuit (ASIC), a field programmable gate array (FPGA) or a state machine.

17. The apparatus of claim 14, wherein
the interface is further configured to receive a second message sent between the first node and the correspondent node, the second message comprising a second header;
the processing device is further configured to remove the second header, determine whether the second message is already associated with a security tunnel and create the security tunnel if the second message is not already associated with a security tunnel, wherein the second message is sent using the security tunnel to one of the mobile node or a mobility agent.

18. A non-transitory computer-readable storage element having computer readable code stored thereon for programming a computer to perform a method for minimizing tunnels in a network, the method comprising the steps of:
obtaining, state information associated with a first node connected to a mobile network behind a mobile node;
receiving a first message sent along a path between the first node and a correspondent node, wherein while being sent along the path at least one header was added to the first message and was then later removed from the first message prior to the first message being received;
recreating the at least one added and then later removed header using the state information to generate at least one recreated header; and
sending the first message with the at least one recreated header along the path.

19. The non-transitory computer-readable storage medium of claim 18, wherein the non-transitory computer readable storage medium comprises at least one of a hard disk, a CD-ROM, an optical storage device or a magnetic storage device.

20. The non-transitory computer-readable storage medium of claim 18, wherein the non-transitory computer readable code further for programming the computer to perform the steps of:
receiving a second message sent between the first node and the correspondent node, the second message comprising a second header;
removing the second header;
determining whether the second message is associated with a security tunnel;
when the second message is associated with a security tunnel, sending the second message using the security tunnel; and
when second message is not associated with a security tunnel, creating a security tunnel and sending the second message using the created security tunnel, wherein the second message is sent to one of the mobile node or a mobility agent.

* * * * *